US010831955B1

United States Patent
Cooke et al.

(10) Patent No.: US 10,831,955 B1
(45) Date of Patent: Nov. 10, 2020

(54) PREDICTION OF CLOSURE FEASIBILITY IN MICROPROCESSOR DESIGN

(71) Applicant: International Business Machines Corporation, Armonk, NY (US)

(72) Inventors: Matthew A. Cooke, Cedar Park, TX (US); Zhichao Li, Austin, TX (US); Kai Liu, Malden, MA (US); Su Liu, Austin, TX (US); Manjunath Ravi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/687,762

(22) Filed: Nov. 19, 2019

(51) Int. Cl.
*G06F 30/327* (2020.01)
*G06N 3/04* (2006.01)
*G06F 30/3312* (2020.01)

(52) U.S. Cl.
CPC ........ *G06F 30/327* (2020.01); *G06F 30/3312* (2020.01); *G06N 3/0454* (2013.01)

(58) Field of Classification Search
CPC .. G06F 30/327; G06F 30/3312; G06N 3/0454
USPC ........................................................ 716/104
See application file for complete search history.

(56) References Cited

U.S. PATENT DOCUMENTS

| | | | |
|---|---|---|---|
| 5,461,576 A | 10/1995 | Tsay et al. | |
| 5,514,849 A | 5/1996 | Findlan et al. | |
| 5,544,066 A | 8/1996 | Rostoker et al. | |
| 5,870,308 A | 2/1999 | Dangelo et al. | |
| 6,216,252 B1 | 4/2001 | Dangelo et al. | |
| 6,324,678 B1 | 11/2001 | Dangelo et al. | |
| 6,487,705 B1 | 11/2002 | Roethig et al. | |
| 7,133,819 B1 | 11/2006 | Hutton | |
| 7,137,093 B2 | 11/2006 | Harn | |
| 7,143,367 B2 | 11/2006 | Eng | |
| 7,409,658 B2 | 8/2008 | Shang | |
| 10,699,053 B1 * | 6/2020 | Wang | G06F 30/398 |
| 2002/0059553 A1 | 5/2002 | Eng | |
| 2005/0034091 A1 | 2/2005 | Harn | |
| 2005/0268267 A1 | 12/2005 | Shang | |
| 2018/0203956 A1 * | 7/2018 | Ng | G06F 30/39 |
| 2018/0359852 A1 * | 12/2018 | Geva | H05K 1/0292 |
| 2019/0057174 A1 * | 2/2019 | Hashimoto | G06F 30/3312 |
| 2019/0228126 A1 * | 7/2019 | Oh | G06N 5/003 |
| 2019/0325092 A1 * | 10/2019 | Ren | G06N 3/08 |
| 2020/0074276 A1 * | 3/2020 | Cooke | G06N 3/0454 |
| 2020/0104452 A1 * | 4/2020 | Geva | G06F 30/30 |
| 2020/0104457 A1 * | 4/2020 | Chuang | G06F 30/394 |
| 2020/0104459 A1 * | 4/2020 | Tong | G06N 7/023 |
| 2020/0175216 A1 * | 6/2020 | Ho | G06F 30/394 |

* cited by examiner

*Primary Examiner* — Suresh Memula
(74) *Attorney, Agent, or Firm* — Peter J. Edwards

(57) ABSTRACT

A method for predicting post-placement timing-analysis results includes obtaining, for a logic design, logic-synthesis data and logic-planning data. The method also includes inputting, into a neural network, the logic-synthesis data and logic-planning data. The neural network is trained to correlate logic-synthesis data and logic-planning data with post-placement timing-analysis results. The method also includes receiving, from the neural network, predicted post-placement timing-analysis results.

20 Claims, 5 Drawing Sheets

US 10,831,955 B1

PREDICTION OF CLOSURE FEASIBILITY IN MICROPROCESSOR DESIGN

BACKGROUND

The present disclosure relates to microprocessor design, and more specifically, to computer systems that facilitate the process of refining designs of microprocessors.

The typical microprocessor-design process involves multiple stages of design. These are sometimes grouped into logic design and physical design. In logic design, long strings of arithmetical/logical operations of a microprocessor that make up the complex macros of the microprocessor are designed. In physical design, the logical macros and other components are placed and wiring to connect the macros and components are routed. Because the placement and routing of a logical macro may rely on the design of the macro, the logic design typically occurs before physical design.

SUMMARY

Some embodiments of the present disclosure can be illustrated as a method for predicting post-placement timing-analysis results. The method may comprise obtaining, for a logic design, logic-synthesis data and logic-planning data. The method may also comprise inputting, into a first neural network, the logic-synthesis data and logic-planning data. The first neural network may be trained to correlate logic-synthesis data and logic-planning data with post-placement timing-analysis results. Finally, the method may comprise receiving, from the first neural network, predicted post-placement timing-analysis results.

Some embodiments of the present disclosure can also be illustrated as a computer program product. The computer program product may comprise a computer readable storage medium having program instructions embodied therewith. The program instructions may be executable by a computer to cause the computer to obtain, for a logic design, logic-synthesis data and logic-planning data. The program instructions may also cause the computer to input, into a first neural network, the logic-synthesis data and logic-planning data. The first neural network may be trained to correlate logic-synthesis data and logic-planning data with successful timing closure. Finally, the program instructions may also cause the computer to receive, from the first neural network, a closure-feasibility metric. The closure-feasibility metric may represent the predicted feasibility of timing closure.

Some embodiments of the present disclosure can also be illustrated as a processor and a memory in communication with the processor. The memory may contain program instructions that, when executed by the processor, are configured to cause the processor to perform a method. The method may comprise obtaining, for a logic design, logic-synthesis data and logic planning data. The method may also comprise inputting, into a first neural network, the logic-synthesis data and logic-planning data. The first neural network may be trained to correlate logic-synthesis data and logic planning-data with post-placement timing-analysis results. The method may also comprise receiving, from the first neural network, predicted post-placement timing-analysis results. The method may also comprise inputting, into a second neural network, the logic-synthesis data, logic-planning data, and predicted post-placement timing-analysis results. The second neural network may be trained to correlate logic-synthesis data, logic-planning data, and predicted post-placement timing-analysis results with successful timing closure. Finally, the method may also comprise receiving, from the second neural network, a closure-feasibility metric. The closure-feasibility metric may represent the predicted feasibility of timing closure.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
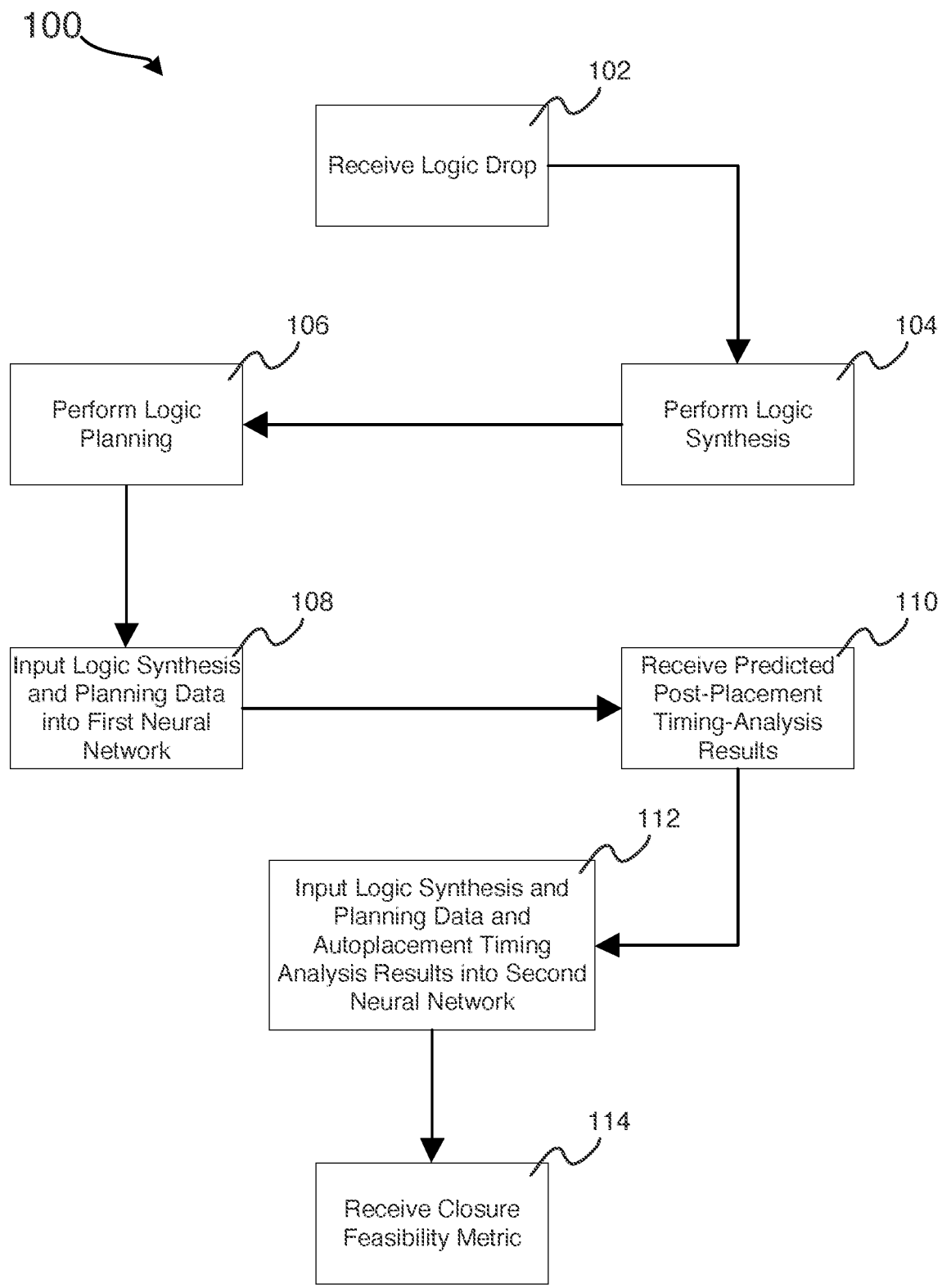
FIG. 1 illustrates an example method for determining a closure feasibility metric utilizing logic-synthesis data and logic-planning data for a logic drop, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to microprocessor design, and more specifically, to computer systems that facilitate the process of refining designs of microprocessors. While the present disclosure is not necessarily limited to such applications, various aspects of the disclosure may be appreciated through a discussion of various examples using this context.

Typical microprocessor design involves the multiple design phases that can, for the sake of understanding, be categorized into a logic-design phase and a physical-design phase. Logic design typically refers to the design of long strings of arithmetical/logical operations that perform most operations of the microprocessor during runtime. These strings of arithmetical/logical operations may be referred to herein as "logical macros," "logic macros," or simply "macros." At the conclusion of the logic-design phase, a logic design is prepared and provided for the physical-design phase. This may be referred to herein as a "logic drop."

Physical design typically is considered to begin with logic synthesis and logic planning, which involve, respectively, translating the logic design into a logic implementation (typically creating a schematic of logic gates) and tracking the number of macros, portions of macros or groups of macros (referred to herein as "nets"), and the connection between them. Physical design typically also includes, after the logic synthesis and planning phase, placement of logical macros at specific locations on a microprocessor (e.g., on particular layers or coordinate locations on those layers) and routing of placed components (e.g., designing the wiring between placed logical macros).

One of the goals of logic design and physical design, separately and together, is to pursue an overall microprocessor design in which signals travelling through the various paths of the microprocessor (e.g., logical macros and the pins and wires that connect the logical macros) arrive at their destinations when they are intended to arrive. Paths for which a signal arrives when required for microprocessor function are often referred to as "closed paths," whereas paths for which a signal arrives later than required are often referred to as "open paths." The process of attempting to remedy (i.e., to close) those open paths is referred to as timing closure.

If the logic design, physical design, or combination of logic design and physical design of a microprocessor are sufficiently inefficient (for example, that result in signals taking longer to traverse a path than may be necessary, intended, or required), open paths may result, which can create serious errors (or total failure) when attempting to operate the microprocessor. For example, inefficiencies could exist throughout a logical macro, in the placement of logical macros on a layer of the microprocessor, or the routing between the macros (including the speed of wire connecting the components on a path).

For this reason, the logic design phase is sometimes focused on developing a logic design that facilitates feasible timing closure in the physical design phase. For some paths, therefore, a moderately efficient physical design may be sufficient to ensure path closure. However, in some instances pursuing timing closure using solely physical-design efforts may be very difficult, if not impossible. In these instances, changes to the logic design may be necessary to achieve timing closure. Thus, in some instances, logic modifications after a logic drop may be necessary for timing closure. However, the physical design of a microprocessor is typically dependent on the corresponding logic design. Therefore, logic modifications after the physical-design phase has started may also require changes, if not a complete overhaul, to the physical design as well.

Unfortunately, accurately determining the feasibility of achieving timing closure using solely physical-design efforts may, in many instances, not be possible until much of those physical-design efforts have already been completed. In some instances, this may be because an open path is not identified until late in the physical-design phase, where the timing analysis tends to be most accurate. However, in some instances, even when one or more open paths is discovered early in the physical-design phase, it may be beneficial to attempt to close the one or more open paths with significant physical-design effort. This may be because, in many use cases, logic design modifications typically take significantly longer to create that physical designs or the alterations thereof. Therefore, without an indication of whether timing closure could be feasibly achieved for a logic design with one or more open paths, it may be advisable to pursue significant possible physical-design solutions before resorting to logic-design modifications. In some instances, even pursuing all possible physical-design solutions may be advisable before undergoing logic-design modifications. However, if physical-design solutions are unable to achieve timing closure, the effort spent on those physical-design solutions may be lost when logic-design modifications are made. In some instances days or weeks of physical-design efforts may be lost.

As previously discussed, this occurs because it is oftentimes difficult to determine the feasibility of achieving timing closure using physical-design solutions until after those physical-design solutions have failed to achieve timing closure. However, due to the significant time that is often required to develop logic-design modifications, the risk that the effort spent on physical-design modifications is wasted (for example, if logical-design modifications require a rework of physical design) may be acceptable if there is a chance that those physical-design modifications may prevent a need for logic-design modifications. On the other hand, if the feasibility of achieving timing closure could be determined earlier in the physical-design process, the efforts that would otherwise be spent on physical-design modifications that ultimately fail to achieve timing closure may be saved.

For this reason, a system by which the feasibility of achieving timing closure in the physical-design phase could be accurately predicted earlier in the physical-design phase would be beneficial. Some methods attempt to accomplish this by incorporating automated tools that, for example, perform automatic placement of components and routing to approximate an efficient physical design. These approximations may then be used for timing analysis to gauge the extent of timing violations (e.g., open paths or groups of open paths), rather than relying on final design data that may require manual investment. For example, some timing analysis may occur at after automatic placement (sometimes referred to herein as "autoplacement") and automatic routing (sometimes referred to herein as "autorouting"), which may result in very accurate timing analysis. However, because timing analysis at this stage requires logic synthesis and logic planning, autoplacement, and autorouting to be completed, which may, in some instances, still require significant time investment (e.g., 70 hours) to complete. This time investment may be an unacceptable delay, in some use cases.

At the other end of the spectrum, typical logic timing analysis may only require logic-synthesis and logic-planning data, which may only require 2 or 3 hours to complete. However, because logic timing analysis does not incorporate any placement or routing data, it can sometimes be very inaccurate. Thus, any attempt at determining the feasibility of timing closure based off logic timing analysis may also be very inaccurate. This inaccuracy may also be unacceptable in some use cases.

Thus, in some use cases it may be desirable to perform timing analysis that incorporates not only logic-synthesis data and logic-planning data, but also autoplacement data. In typical microprocessor design, autoplacement is the next stage of the physical-design process, and thus incorporating autoplacement data may be an incremental improvement over logical timing analysis. Further, in many use cases, timing analysis performed after autoplacement may be accurate enough to provide a substantial benefit over logic timing analysis.

However, performing autoplacement can also take a significant time investment (e.g., 24 hours), which may delay the overall design process by several business days. In many use cases, even this time investment may represent an unacceptable delay when attempting to gauge the feasibility of achieving timing closure using physical-design modifications. However, as previously noted, performing timing analysis without any placement data may result in feasibility estimations that are unacceptably accurate. For these reasons, a system that is able to incorporate some placement timing data in a timing-closure-feasibility prediction, without the delays associated with performing manual placement or autoplacement, would be beneficial.

Some embodiments of the present disclosure address the above issues by utilizing a neural network to predict post-placement timing data based on correlations between logic-synthesis data, logic-planning data, and post-placement timing data. That predicted post-placement timing data may then be used in a second neural-network prediction of the feasibility of achieving timing closure for a logic drop using physical-design modifications.

For example, in some embodiments, a first neural network may be trained by designing the first neural network to predict timing analysis data when logic-synthesis data and logic-planning data from actual historical logic drops are input into the neural network. The output of the neural network (i.e., predicted timing data) may then be compared to the historical timing data corresponding to the historical logic drop (e.g., data from actual timing analysis performed after the placement phase for the historical logic drop from which the input synthesis and planning data was derived). If the predicted timing data differs from the historical timing data to an unacceptable degree, the neural network may be adjusted (e.g., the weights and biases may be tweaked) and another prediction may be performed. This process may be repeated with other sets of training data until the neural network is able to consistently and accurately predict post-placement timing data using logic-synthesis data and logic-planning data.

In some embodiments, a second neural network may be trained by designing the second neural network to predict a metric that gauges the feasibility of achieving timing closure when logic-synthesis data, logic-planning data, and post-placement timing data (or predicted post-placement timing data) for historical logic drops are input into the neural network. This output metric may be referred to herein as a closure feasibility metric, and may, for example, take the form of a number falling between (and including) 1.0 and 0.0. For example, an output of 1.0 may predict 100% feasibility (i.e., certainty of achieving timing closure), an output of 0.6 may predict 60% feasibility (i.e., 60% confidence that timing closure could be achieved), and an output of 0.0 may predict 0% feasibility (i.e., certainty that timing closure could not be achieved). This output metric may then be compared to a binary value that reflects whether timing closure was actually achieved for the historical logic drop to which the input data corresponds. For example, if timing closure was achieved for the historical logic drop, the binary value may be "1.0," but if the timing closure was not achieved for the historical logic drop, the binary value may be "0.0." If the output metric differs from the binary value to an unacceptable degree (e.g., over 20% deviation), the neural network may be adjusted and another prediction may be performed. This process may be repeated with other sets of training data until the neural network is able to consistently and accurately predict the feasibility of timing closure using logic-synthesis data, logic-planning data, and post-placement timing data.

FIG. 1 illustrates an example method 100 for determining a closure feasibility metric utilizing logic-synthesis data and logic-planning data for a logic drop. Method 100 may be performed, for example, by a computer system controlling one or more neural networks. Method 100 begins with block 102, in which a logic drop is received for physical design. In block 104, logic synthesis is performed for the drop. Logic synthesis may result in data such as timing data (e.g., worst negative slack, number of paths with negative slack), electrical data (e.g., slew rate for components in the logic drop, such as pins and capacitors), netlist data (e.g., a list of gates and a list of nets), congestion data (e.g., a measure of the density of gates and wires in the logic drop), runtime (e.g., a measure of the expected time required to close the design), memory (e.g., a measure of the amount of memory space required to simulate the design), expected integration design (e.g., number of buffers, fanout) and others. In this way, logic synthesis may be an indicator of expected connection complexity.

In block 106, logic planning is performed. Logic planning may also be referred to as "zero wire length" analysis, and may analyze a logic design by accounting for the logic gates but ignoring integration of those logic gates (e.g., buffers, routing, etc.). In this way, logic planning may be an indicator of logic count. Logic planning may result in data such as cycle time, path gate count, path gate delay, ideal path length, and actual path length. These data may be expressed as average values for sets of paths grouped based on performance (e.g., the top 1% of paths based on worst slack, the top 10% of paths based on total slack, the top 50% of paths based on congestion, and the top 100% of paths (i.e., all paths)). While, as illustrated, blocks 104 and 106 are performed separately, in some embodiments logic synthesis and logic planning may be performed together. In such embodiments, blocks 104 and 106 may be merged.

In block 108, data obtained from logic synthesis and logic planning are input into a first neural network. These data may be input in any form that the neural network has been configured to accept. For example, the first neural network may be configured to accept vectorized data, in which case the data from logic planning and logic synthesis may be converted to one or more vectors (i.e., a list of numbers, such as a 1 by X matrix, that represent more complex data). In some embodiments, this first neural network may be trained to accept logic-synthesis data and logic-planning data and recognize patterns therein that the neural network has correlated with historical post-placement timing results. The first neural network may be trained to then predict timing results that would be obtained from timing analysis performed after physical-design placement for the logic drop received in block 102.

In block 110, predicted post-placement timing-analysis results are received from the first neural network. In some embodiments, data in the predicted timing analysis may include predicted critical path, predicted max time violation, and predicted worst slack. The predicted post-placement timing-analysis results is then input into a second neural network with the logic-synthesis data and logic-planning data obtained as a result of blocks 104 and 106. These three sources of data may be formatted in any form that the neural network has been configured to accept. For example, the second neural network may be configured to accept data in a spreadsheet format or other similar matrix format (e.g., a comma separated values file), in which case the logic-synthesis data, logic-planning data, and post-placement timing-analysis results may be input into the second neural network in one or more spreadsheets. The second neural network may be trained to recognize patterns in the logic-synthesis data, the logic-planning data, and the predicted post-placement timing-analysis results that the neural network has correlated with historical data recording the success or failure to achieve timing closure. The second neural network may then be trained to predict the feasibility of achieving timing closure for the logic drop received in block 102. This prediction may be referred to herein as a closure feasibility metric, and may take the form, for example, of a confidence value (e.g., a number between 1 and 0 or a percentage). In block 114, this closure feasibility metric is received from the second neural network.

As illustrated, method 100 utilizes two neural networks that may both be trained separately and have different outputs. However, in some embodiments a single neural network may be trained to accept logic-synthesis data and logic-planning data and output a closure feasibility metric based on correlations that the single neural network has been trained to associate between recognized patterns in the input data and historical data recording the success or failure to achieve timing closure. In such embodiments, method 100 may not include blocks 110 and 112, but rather method 108 lead directly to block 114. Such embodiments may be beneficial, for example, in use cases in which training resources are scarce and thus training two separate neural networks may be overly burdensome.

However, in some embodiments separately predicting post-placement timing-analysis results may be beneficial. For example, in some embodiments a microprocessor designer may receive a closure feasibility metric of 25% confidence of achieving timing closure, and may wonder why the confidence is so low. In those instances, the microprocessor designer may appreciate reviewing the predicted post-placement timing-analysis results separately as a troubleshooting measure. In other embodiments, a microprocessor designer overseeing method 100 may review the predicted post-placement timing-analysis results and realize, based on those results and before block 112, that the feasibility of achieving timing closure is very low. The microprocessor designer may, in this instance, interrupt method 100 and begin preparations for performing logic-design modifications, which may prevent losing time that would otherwise be spend on blocks 112 and 114.

Further, in some embodiments predicting post-placement timing-analysis results separately from a closure feasibility metric may be beneficial due to the accuracy of the two predictions. For example, in some use cases the training data available to train a neural network to predict post-placement timing-analysis results (i.e., post-placement timing analysis results from historical logic drops) may be significantly more numerous than the training data available to train a neural network to predict a closure feasibility metric (i.e., data recording the success or failure to achieve timing closure for historical logic drops). This may be because a very high percentage of logic drops progress past the placement stage, so training data may be numerous and consistent. However, logic drops may not achieve timing closure for various reasons and failure to achieve timing closure may occur at various points of physical design. For example, one logic drop may have failed to achieve timing closure because all practical physical design modifications were attempted at the final stage of physical design, but open paths remained. However, another logic drop with a high promise of achieving timing closure may have "failed" to achieve timing closure because the logic design was modified for reasons other than timing. Further, another logic drop with moderate chance of achieving timing closure may have "failed" to achieve timing closure because the designer saw some complications with performing physical-design modifications at the post-placement stage and was not perfectly happy with the logic design anyway, so decided it was not worth the hassle and rolled back to logic design prematurely. For these reasons, the data available for predicting post-placement timing-analysis results may make better timing data, and thus the reliability of the prediction received in block 110 may be greater than the reliability of the metric received at block 114.

Finally, in some embodiments the second neural network may not actually be trained on the exact same product, architecture, or process that corresponds to the logic drop received at block 102. Similar to the previous discussion, this may occur because it may take longer to develop a sufficient amount of reliable training data for the second neural network than it takes to develop a sufficient amount of training data for the first neural network. Thus, when a new product, architecture, or process is developed, a neural network that is trained to make correlations between logic-synthesis and logic-planning data and post-placement timing-analysis results may be available before a neural network that is trained to make correlations between logic-synthesis data, logic-planning data, and post-placement timing-analysis results and closure feasibility is available. However, in some use cases the second neural network may be less affected by developments in the new product, architecture, or process, and therefore may still be used with the newly trained first neural network. In such use cases it may be beneficial to keep the two neural networks separate so the first neural network may be retrained on a new product, architecture, or process without altering the second neural network.

Figure 2:
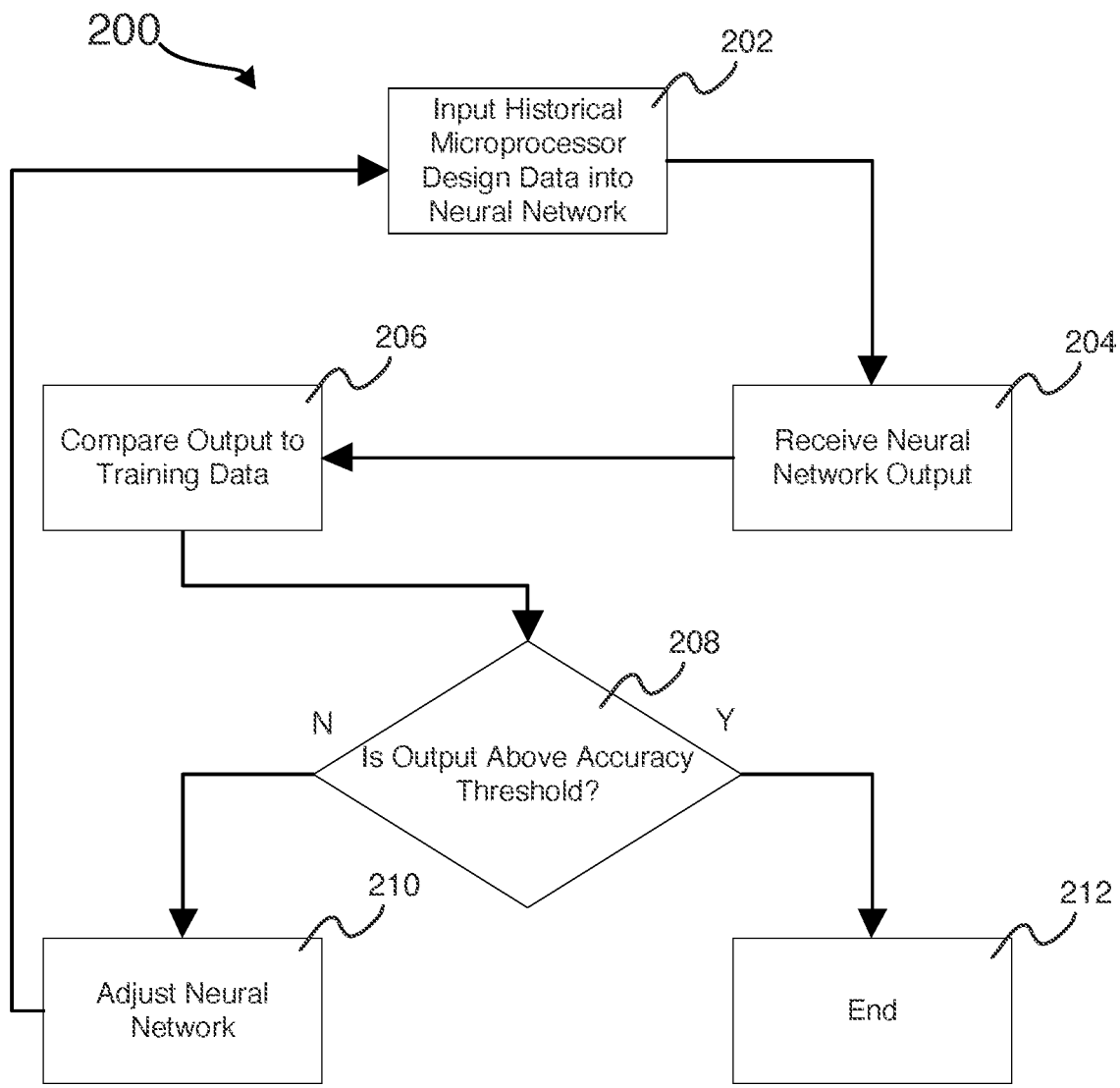
FIG. 2 illustrates a method of training a neural network to make correlations using historical microprocessor design data in accordance with embodiments of the present disclosure.

For the sake of understanding, FIG. 2 illustrates a method 200 of training a neural network to make correlations using historical microprocessor design data. In some embodiments, method 200 may be performed with the help of a human developer responsible for comparing outputs of the neural network to training data. In other embodiments, however, a computer may be capable of automating method 200 by comparing outputs to training data and performing back propagation through the neural network when neural network outputs are not sufficiently accurate.

In block 202, historical microprocessor design data is input into the neural network being trained. In some embodiments, this may be a neural network that is being trained to trained to accept logic-synthesis data and logic-planning data and recognize patterns therein that are correlated with historical post-placement timing results. In such embodiments, the historical microprocessor design data may take the from or logic-synthesis data, logic-planning data, or both. In some embodiments, on the other hand, the neural network may be a neural network that is being trained to accept logic-synthesis data, logic-planning data, and predicted post-placement timing results and recognize patterns therein that are correlated with historical data recording the success or failure or achieving timing closure.

In block 204, an output of the neural network is received. In some embodiments, this output may take the form of predicted post-placement timing-analysis data (for example, when training a neural network analogous to the "first neural network" of FIG. 1). In other embodiments, this output may take the form of a closure feasibility metric (for example, when training a neural network analogous to the "second neural network" of FIG. 1).

In block 206, the output received in block 204 is compared to corresponding training data. For example, if the output received in block 204 is predicted post-placement timing-analysis data, the training data in block 206 may take the form of actual post-placement timing-analysis data (e.g., historical results of timing analysis performed after actual component placement or autoplacement). If, on the other hand, the output received in block 204 is a closure feasibility metric, the training data in block 206 may take the form of historical data recording the success or failure to achieve timing closure (for example, a 1.0 for success and a 0.0 for failure).

In block 208, the results of the comparison in block 206 are analyzed to determine whether the output received in block 204 is above an accuracy threshold of the output received in block 208. In some embodiments, this determination may be intended to identify when a neural network is sufficiently trained to make reliable predictions. For example, if the training data took the form of a value indicating that the associated historical logic design did achieve timing closure (e.g., 1.0), and the accuracy threshold were 85%, any output received as part of block 204 above at least 85% similar to the training data (e.g., 0.85 or higher) may be considered within the threshold within the threshold in block 208. In these instances, the method would end in block 212.

In other embodiments, the accuracy threshold may take the form of a maximum deviation from the training data. For example, if the neural network output took the form of predicted post-placement timing-analysis results and the accuracy threshold took the form of a 10% maximum deviation, any output received in block 204 that differed from the training data by over 10% would result in the neural network being adjusted (e.g., adjusting the neural-network weights and biases) in block 210. After the neural network is adjusted in block 210, more historical microprocessor design data is input into the neural network in block 202, beginning another iteration of method 200. In some embodiments, method 200 may repeat until the neural network is determined to be sufficiently accurate.

Figure 3:
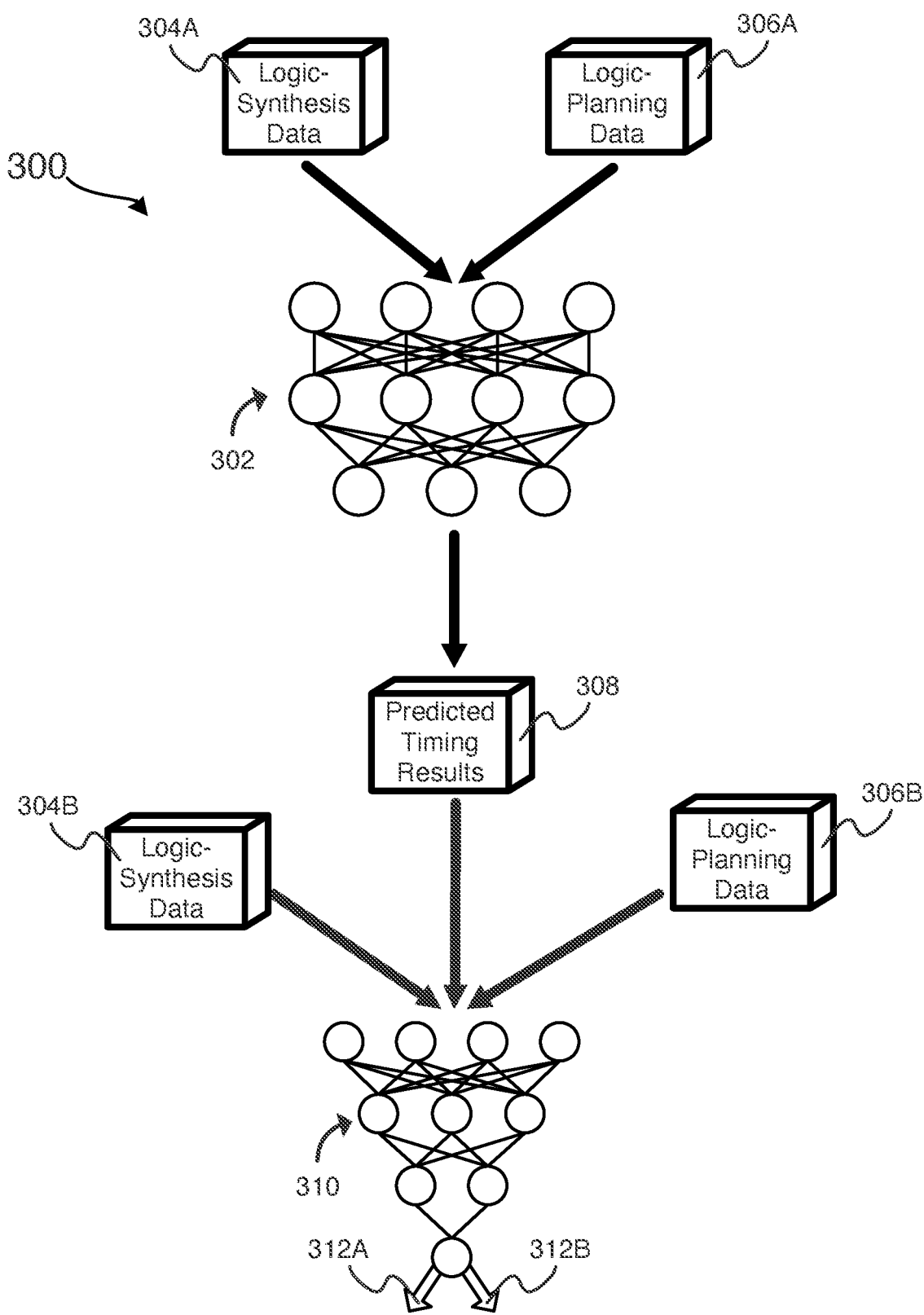
FIG. 3 illustrates an example diagram of a system for predicting a closure feasibility metric in accordance with embodiments of the present disclosure.

FIG. 3 illustrates an example diagram of a system 300 for predicting a closure feasibility metric in accordance with embodiments of the present disclosure. In FIG. 3, system 300 is illustrated as an abstracted diagram of inputs, neural-network components, and outputs. As such, the illustration is presented to aid in comprehension, rather than disclose a precise representation of any particular embodiment.

System 300 includes first neural network 302, which may be trained to predict post-placement timing-analysis results for a logic drop after logic synthesis and planning but before placement or autoplacement. Logic-synthesis data 304A and logic-planning data 306A are input into first neural network 302. This input may be performed by user, such as a microprocessor designer, or by a computer system that is controlling the prediction of post-placement timing-analysis results or by a computer system that is controlling the generation of a closure-feasibility metric. While, in FIG. 3, logic-synthesis data 304A and logic-planning data 306A are illustrated as separate inputs, in some embodiments they may be combined into a single input before being input into first neural network 302.

First neural network 302 outputs predicted timing results 308. Predicted timing results 308 may be, as previously discussed, a prediction of what the results of timing analysis would be if the timing analysis were performed after placement or autoplacement. Predicted timing results 308 may be delivered to a user (e.g., a microprocessor physical-design engineer) at this stage.

System 300 also includes second neural network 310. Second neural network 310 may be trained to generate a closure feasibility metric for a logic drop after logic synthesis and planning but before placement or autoplacement. As illustrated, predicted timing results 308 are input into a second neural network 310 along with logic-synthesis data 304B and logic-planning data 306B. Logic-synthesis data 304B and logic-planning data 306B may be the same inputs as logic-synthesis data 304A and logic-planning data 306A respectively, or they may be copies of logic-synthesis data 304A and logic-planning data 306A. As illustrated, predicted timing results 308, logic-synthesis data 304B, and logic-planning data 306B are three separate inputs, but in some embodiments they may be combined into a single input before being input into second neural network 310.

Second neural network 310 may output metric confidence values 312A and 312B. Confidence values may be reciprocal values that express the positive and negative confidence that timing closure is feasible. For example, confidence value 312A may express the confidence that timing closure is feasible, and confidence value 312B may express the confidence that timing is not feasible. If, for example, second neural network 310 outputs "0.7" for confidence value 312A, it may then express that second neural network 310 has calculated a 70% confidence that timing closure using only physical design is feasible. If confidence values 312A and 312B are reciprocals, confidence value 312B would, in this example, be output as "0.3," expressing that second neural network 310 has calculated a 30% confidence that timing closure using only physical design is not feasible.

As has been discussed previously, a neural network may process and analyze input data (here, a combination of logic-synthesis data, logic-planning data, and predicted post-placement timing-analysis results) by recognizing patterns in the input data and comparing those patterns to patterns related to historical logic drops on which the neural network has been trained. For example, a neural network may recognize several patterns in the data expressed by an input vector for a particular logic drop. The neural network may then associate some of those patterns with the patterns associated with historical logic drops that the neural network has been trained (e.g., by human-supervised training or automatic training) to predict post-placement timing-analysis results or to generate a closure-feasibility metric.

In some embodiments, data input into a neural network may take the form of a vector. A vector may be a one-dimension matrix (e.g., a matrix with one row and many columns) of numbers, each of which expresses data related to, for example, logic synthesis, logic planning, or timing analysis. A vector may also be referred to herein as an "input vector," a "feature vector," or a "multi-dimension vector." For example, as previously discussed, this vector may include timing data, electrical data, netlist data, congestion data, cycle time, path gate count, path gate delay, ideal path length, and actual path length, predicted post-placement timing-analysis data, and others.

Figure 4:
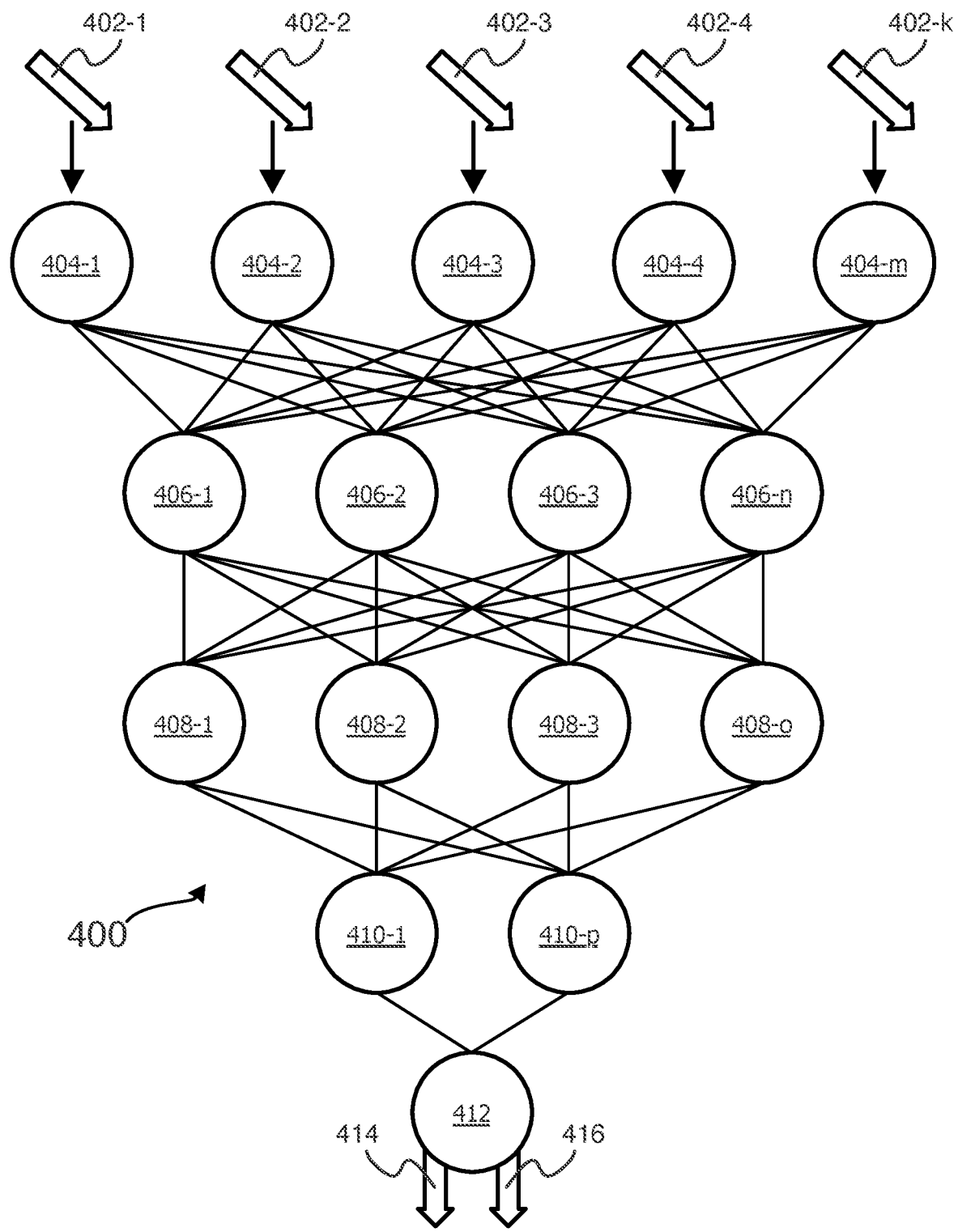
FIG. 4 illustrates the representative major components of a neural network that may be used in accordance with embodiments.

Such a neural network is illustrated in FIG. 4. In FIG. 4, neural network 400 may be trained to predict post-placement timing-analysis results or to determine a confidence value that expresses a feasibility that timing closure may be achieved for a logic drop using only physical-design modifications. The inputs of neural network 400 are represented by feature vectors 402-1 through 402-$k$. These feature vectors may contain all information that is available after logic synthesis and logic planning, and, in some embodiments, prediction of post-placement timing-analysis results. In some embodiments, feature vectors 402-1 through 402-$k$ may be identical copies of each other. In some embodiments, more of instances of feature vectors 402 may be utilized. The number of feature vectors 402-1 through 402-$k$ may correspond to the number of neurons in feature layer 404. In other words, in some embodiments, the number of inputs 402-1 through 402-$k$ (i.e., the number represented by m) may equal (and thus be determined by) the number of first-layer neurons in the network. In other embodiments, neural network 400 may incorporate 1 or more bias neurons in the first layer, in which case the number of inputs 402-1 through 402-k may equal the number of first-layer neurons in the network minus the number of first-layer bias neurons.

Feature layer 404 contains neurons 401-1 through 401-m. Neurons 404-1 through 404-m accept as inputs feature vectors 402-1 through 402-k and process the information therein. Once vectors 402-1 through 402-k are processed, neurons 404-1 through 404-m provide the resulting values to the neurons in hidden layer 406. These neurons, 406-1 through 406-n, further process the information, and pass the resulting values to the neurons in hidden layer 408. Similarly, neurons 408-1 through 408-o further process the information and pass it to neurons 410-1 through 410-p. Neurons 410-1 thorough 410-p process the data and deliver it to the output layer of the neural network, which, as illustrated, contains neuron 412. Neuron 412 may be trained to calculate two values—value 414 and value 416. Value 414 may represent the likelihood that timing closure for a logic drop is feasible using only physical-design modifications. Value 416, on the other hand, may represent the likelihood that timing closure for the logic drop is not feasible using only physical-design modifications.

In some embodiments, neural network 400 may have more than 5 layers of neurons (as presented) or fewer than 5 layers. These 5 layers may each comprise the same amount of neurons as any other layer, more neurons than any other layer, fewer neurons than any other layer, or more neurons than some layers and fewer neurons than other layers. Finally, in some embodiments, the output of output layer 412 may be used to determine whether to pursue physical-design modifications to achieve timing closure for a logic drop, whether to trouble shoot a low feasibility of timing closure, or whether to pursue logic-design modifications.

Figure 5:
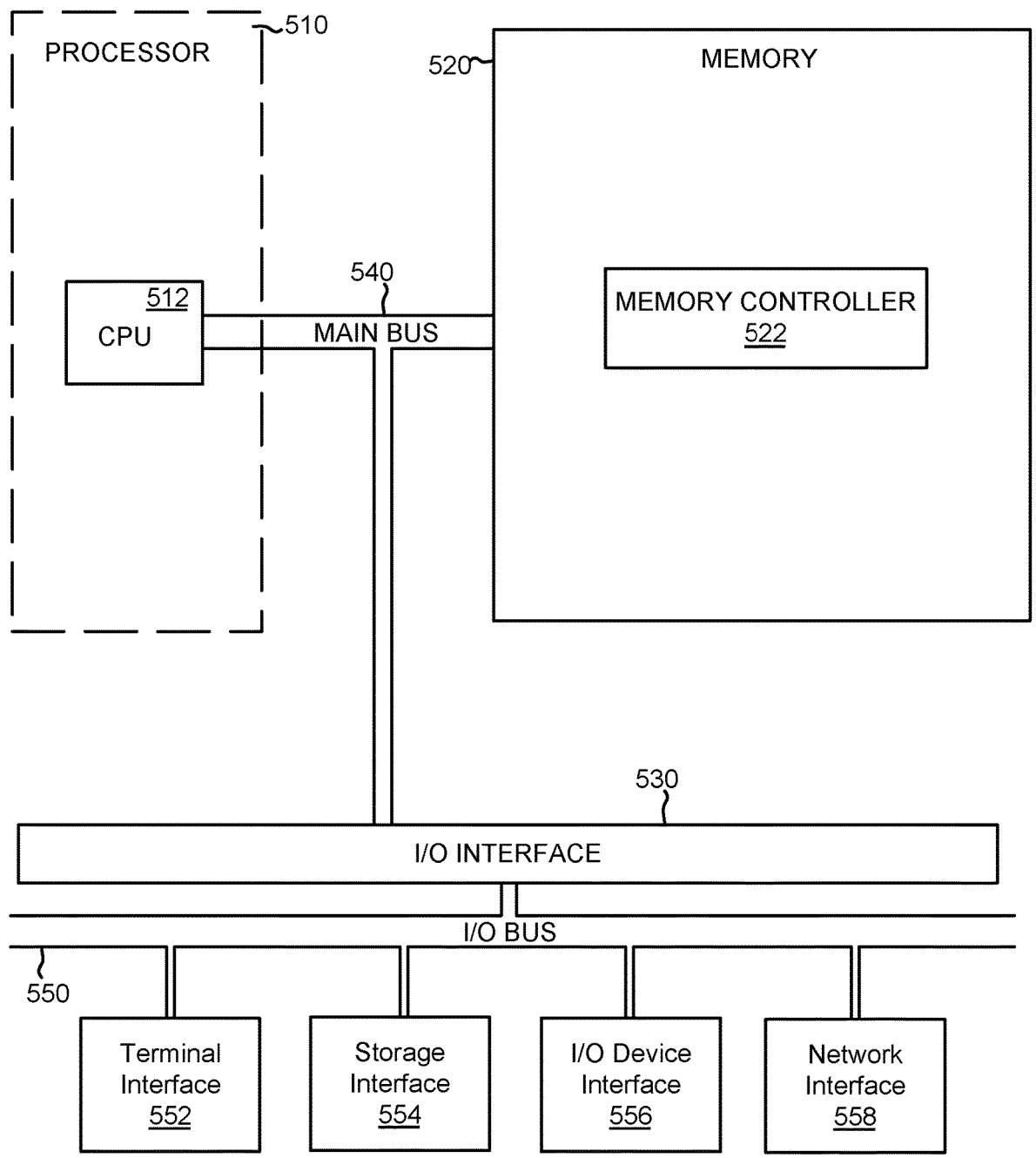
FIG. 5 depicts the representative major components of a computer system that may be used in accordance with embodiments.

FIG. 5 depicts the representative major components of an example Computer System 501 that may be used in accordance with embodiments of the present disclosure. The particular components depicted are presented for the purpose of example only and are not necessarily the only such variations. The Computer System 501 may include a Processor 510, Memory 520, an Input/Output Interface (also referred to herein as I/O or I/O Interface) 530, and a Main Bus 540. The Main Bus 540 may provide communication pathways for the other components of the Computer System 501. In some embodiments, the Main Bus 540 may connect to other components such as a specialized digital signal processor (not depicted).

The Processor 510 of the Computer System 501 may include one or more CPUs 512. The Processor 510 may additionally include one or more memory buffers or caches (not depicted) that provide temporary storage of instructions and data for the CPU 512. The CPU 512 may perform instructions on input provided from the caches or from the Memory 520 and output the result to caches or the Memory 520. The CPU 512 may include one or more circuits configured to perform one or methods consistent with embodiments of the present disclosure. In some embodiments, the Computer System 501 may contain multiple Processors 510 typical of a relatively large system. In other embodiments, however, the Computer System 501 may be a single processor with a singular CPU 512.

The Memory 520 of the Computer System 501 may include a Memory Controller 522 and one or more memory modules for temporarily or permanently storing data (not depicted). In some embodiments, the Memory 520 may include a random-access semiconductor memory, storage device, or storage medium (either volatile or non-volatile) for storing data and programs. The Memory Controller 522 may communicate with the Processor 510, facilitating storage and retrieval of information in the memory modules. The Memory Controller 522 may communicate with the I/O Interface 530, facilitating storage and retrieval of input or output in the memory modules. In some embodiments, the memory modules may be dual in-line memory modules.

The I/O Interface 530 may include an I/O Bus 550, a Terminal Interface 552, a Storage Interface 554, an I/O Device Interface 556, and a Network Interface 558. The I/O Interface 530 may connect the Main Bus 540 to the I/O Bus 550. The I/O Interface 530 may direct instructions and data from the Processor 510 and Memory 520 to the various interfaces of the I/O Bus 550. The I/O Interface 530 may also direct instructions and data from the various interfaces of the I/O Bus 550 to the Processor 510 and Memory 520. The various interfaces may include the Terminal Interface 552, the Storage Interface 554, the I/O Device Interface 556, and the Network Interface 558. In some embodiments, the various interfaces may include a subset of the aforementioned interfaces (e.g., an embedded computer system in an industrial application may not include the Terminal Interface 552 and the Storage Interface 554).

Logic modules throughout the Computer System 501—including but not limited to the Memory 520, the Processor 510, and the I/O Interface 530—may communicate failures and changes to one or more components to a hypervisor or operating system (not depicted). The hypervisor or the operating system may allocate the various resources available in the Computer System 501 and track the location of data in Memory 520 and of processes assigned to various CPUs 512. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    obtaining, for a logic design, logic-synthesis data and logic-planning data;
    inputting, into a first neural network, the logic-synthesis data and logic-planning data, wherein the first neural network is trained to correlate logic-synthesis data and logic-planning data with post-placement timing-analysis results;
    receiving, from the first neural network, predicted post-placement timing-analysis results.

2. The method of claim 1, wherein the method further comprises:
    inputting, into a second neural network, the logic-synthesis data, logic-planning data, and predicted post-placement timing-analysis results, wherein the second neural network is trained to correlate logic-synthesis data, logic-planning data, and predicted post-placement timing-analysis results with successful timing closure; and
    receiving, from the second neural network, a closure-feasibility metric, wherein the closure-feasibility metric represents the predicted feasibility of timing closure.

3. The method of claim 1, wherein the logic-synthesis data and logic-planning data are combined into a single input vector before being input into the first neural network.

4. The method of claim 2, wherein the logic-synthesis data, logic-planning data, and predicted post-placement timing-analysis results are combined into a single input vector before being input into the second neural network.

5. The method of claim 1, wherein the method further comprises:
- obtaining for a historical logic design, historical logic-synthesis data, historical logic-planning data, and actual historical post-placement timing-analysis results;
- inputting, into the first neural network, the historical logic-synthesis data and historical logic-planning data;
- receiving, from the first network, predicted historical post-placement timing-analysis results;
- comparing the predicted historical post-placement timing-analysis results to the actual historical post-placement timing-analysis results;
- determining, based on the comparing, that the predicted historical post-placement timing-analysis results are above an accuracy threshold.

6. The method of claim 5, wherein the historical post-placement timing-analysis results comprise results of timing analysis that was performed after autoplacement of components.

7. The method of claim 5, wherein the historical post-placement timing-analysis results comprise results of timing analysis that was performed after manual placement of components.

8. A computer program product, the computer program product comprising a computer readable storage medium having program instructions embodied therewith, the program instructions executable by a computer to cause the computer to:
- obtain, for a logic design, logic-synthesis data and logic-planning data;
- input, into a first neural network, the logic-synthesis data and logic-planning data, wherein the first neural network is trained to correlate logic-synthesis data and logic-planning data with successful timing closure;
- receive, from the first neural network, a closure-feasibility metric, wherein the closure-feasibility metric represents the predicted feasibility of timing closure.

9. The computer program product of claim 8, wherein the closure-feasibility metric is output as two reciprocal confidence values.

10. The computer program product of claim 8, wherein the closure-feasibility metric is output as a number between 1 and 0.

11. The computer program product of claim 8, wherein the closure-feasibility metric is output as a percentage.

12. The computer program product of claim 8, wherein the program instructions also cause the computer to:
- obtain for a historical logic design, historical logic-synthesis data, historical logic-planning data, and historical closure data, wherein the historical closure data records the success or failure to achieve timing closure for the historical logic design;
- input, into the first neural network, the historical logic-synthesis data and historical logic-planning data;
- receive, from the first network, a historical closure-feasibility metric;
- compare the historical closure-feasibility metric to the historical closure data; and
- determine, based on the comparing, that the historical closure-feasibility metric is above an accuracy threshold.

13. The computer program product of claim 12, wherein the logic design is designed to operate on a first microprocessor architecture and the historical logic design is designed to operate on a second microprocessor architecture.

14. A system comprising:
- a processor; and
- a memory in communication with the processor, the memory containing program instructions that, when executed by the processor, are configured to cause the processor to perform a method, the method comprising:
  - obtaining, for a logic design, logic-synthesis data and logic-planning data;
  - inputting, into a first neural network, the logic-synthesis data and logic-planning data, wherein the first neural network is trained to correlate logic-synthesis data and logic-planning data with post-placement timing-analysis results;
  - receiving, from the first neural network, predicted post-placement timing-analysis results;
  - inputting, into a second neural network, the logic-synthesis data, logic-planning data, and predicted post-placement timing-analysis results, wherein the second neural network is trained to correlate logic-synthesis data, logic-planning data, and predicted post-placement timing-analysis results with successful timing closure; and
  - receiving, from the second neural network, a closure-feasibility metric, wherein the closure-feasibility metric represents the predicted feasibility of timing closure.

15. The system of claim 14, wherein the logic-planning data comprises data pertaining to logic gates but not integration of those logic gates.

16. The system of claim 14, wherein the logic-synthesis data comprises a prediction of the expected connection complexity of the logic design.

17. The system of claim 14, wherein the method performed by the processor further comprises:
- obtaining for a historical logic design, historical logic-synthesis data, historical logic-planning data, and actual historical post-placement timing-analysis results;
- inputting, into the first neural network, the historical logic-synthesis data and historical logic-planning data;
- receiving, from the first network, predicted historical post-placement timing-analysis results;
- comparing the predicted historical post-placement timing-analysis results to the actual historical post-placement timing-analysis results;
- determining, based on the comparing, that the predicted historical post-placement timing-analysis results are above an accuracy threshold.

18. The system of claim 17, wherein the historical post-placement timing-analysis results comprise results of timing analysis that was performed after autoplacement of components.

19. The system of claim 17, wherein the method performed by the processor further comprises:
- obtaining for the historical logic design, historical closure data, wherein the historical closure data records the success or failure to achieve timing closure for the historical logic design;

inputting, into the second neural network, the historical logic-synthesis data and historical logic-planning data;

receiving, from the second network, a historical closure-feasibility metric;

comparing the historical closure-feasibility metric to the historical closure data; and determining, based on the comparing, that the historical closure-feasibility metric is above an accuracy threshold.

20. The system of claim 19, wherein the historical closure data takes the form of a binary value that reflects whether timing closure was actually achieved for the historical logic design.

* * * * *